United States Patent

[11] 3,595,456

[72] Inventor Ben J. Rosenthal
 Skokie, Ill.
[21] Appl. No. 847,049
[22] Filed Aug. 4, 1969
[45] Patented July 27, 1971
[73] Assignee Rosenthal Manufacturing Company Inc.
 Chicago, Ill.

[54] DEVICE FOR FACILITATING THE DISPENSING OF HEAT-SEVERABLE FILM
 9 Claims, 5 Drawing Figs.
[52] U.S. Cl. ............................................. 225/11,
 53/390, 83/171, 219/214, 225/12, 225/20, 225/91
[51] Int. Cl. ............................................. B26f 3/12
[50] Field of Search ...................................... 83/171;
 219/214; 53/390, 389; 225/11, 12, 20, 91

[56] References Cited
UNITED STATES PATENTS
3,016,673 1/1962 Parker ............................ 53/390
3,134,005 5/1964 Mayhew ........................ 83/171
3,452,511 7/1969 Hoffler .......................... 83/171 X Primary Examiner—Frank T. Yost
Attorney—Mueller, Aichele & Rauner ABSTRACT: Heat-severable film-dispensing apparatus which is located underneath a surface on which items are wrapped in the film and which includes rollers for supporting a replaceable film supply roll and a switching mechanism coupled with the film to cause a film-severing wire to be heated when the film is laid out across the wrapping surface. The apparatus also includes a brake for preventing the feed-off of film and a control device for raising a wire guard which are operated in response to the actuation of a switch bar so that the film can be severed by the heated wire.

PATENTED JUL 27 1971
3,595,456
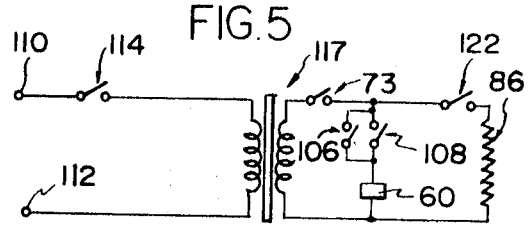
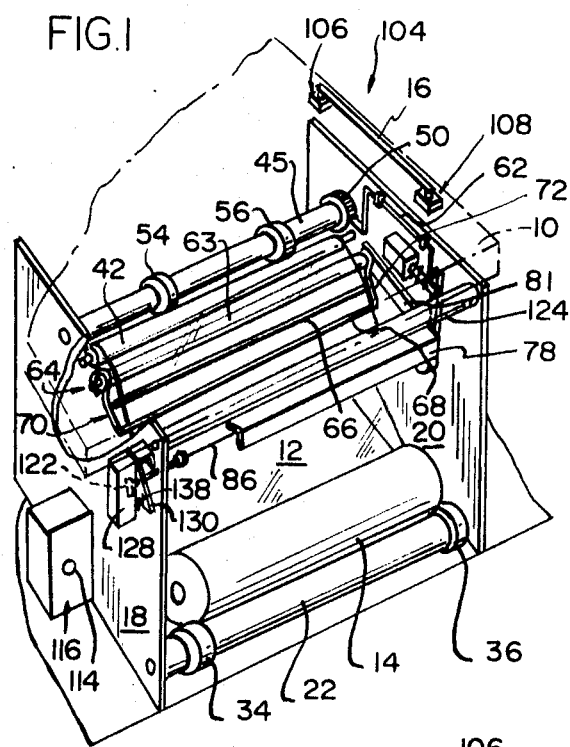
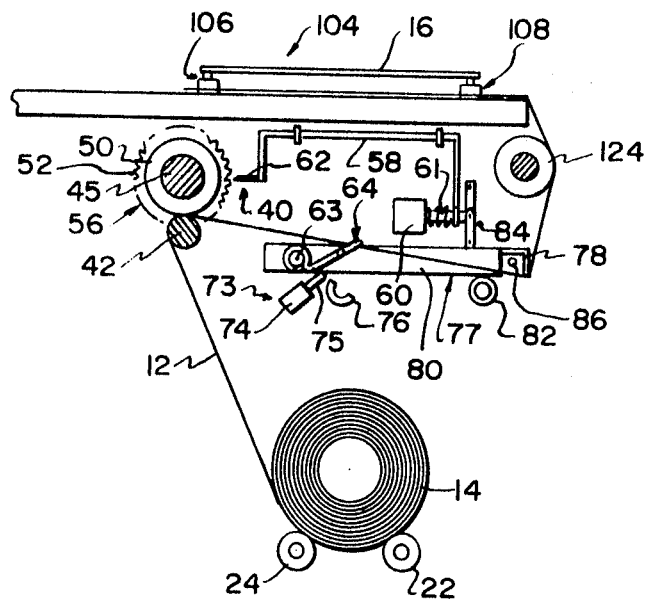
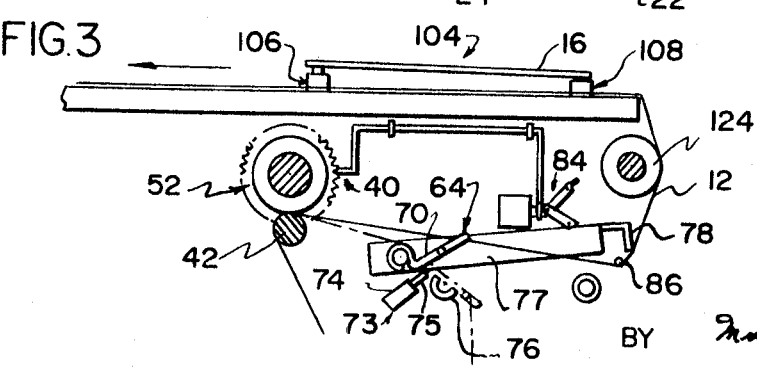
INVENTOR
BEN J. ROSENTHAL
BY Mueller, Aichele & Rauner
ATTORNEYS

DEVICE FOR FACILITATING THE DISPENSING OF HEAT-SEVERABLE FILM

BACKGROUND OF THE INVENTION

Packaging techniques sometimes involve the transporting and storing of various articles in a protective cover of flexible filmlike material. For instance, it is often desirable to wrap goods such as clothing, tablecloths and bed sheets, which have recently been either manufactured or cleaned, in a polyethylene cover so that they are protected from soil, odor, discoloration by the sun, etc. Because of its thinness, pliability and tendency to accumulate electrical charge, the polyethylene material is inherently difficult to handle thus causing the wrapping operation to be time consuming and burdensome. As a result, apparatus is in demand which aids the wrapping operation by quickly and conveniently facilitating the dispensing and severing of polyethylene or other flexible filmlike materials.

Prior art devices, such as those disclosed in U.S. Pat. No. 3,131,278, issued Apr. 28, 1964 to Harry Rosenthal, and U.S. Pat. No. 3,388,623, issued June 18, 1968 to Ben J. Rosenthal, have been developed for dispensing heat-severable, filmlike material from replaceable rolls contained therein. The device of U.S. Pat. No. 3,131,278 is usually placed on the wrapping table thereby taking up space which could otherwise be used in the wrapping operation. Moreover, since the film is suspended in midair immediately after it is severed, the operator must guide the unwieldy film into position on the wrapping surface, and once the film has laid down, the operator must smooth out the film before he can begin the wrapping operation. The device of U.S. Pat. No. 3,388,623, which was patented by the inventor of the present application, is a completely automatic film-dispensing device which is relatively expensive because of its mechanical complexity.

SUMMARY OF THE INVENTION

It is, therefore, an object of the invention to provide an apparatus for facilitating the dispensing of selected lengths of thin, pliable, heat-severable film material which apparatus is convenient to use and requires a minimum of operator time.

It is another object of the invention to provide an inexpensive apparatus for dispensing heat-severable film which can be located underneath a wrapping table so as to not take up space on the surface surface thereof and which severs the film while it is in a laid-down position across the wrapping surface.

A further object is to provide a heat-severable film-dispensing apparatus in which the severing wire is heated only when the film is laid across the wrapping surface and in which the severing wire contacts the film only when a switch activation bar is manually operated.

One embodiment of the invention facilitates and expedites the dispensing and severing of pliable, heat-severable film material from a replaceable supply roll. The dispenser is adapted to be located underneath a horizontal wrapping surface or tabletop on which items are wrapped with the film and includes rollers for supporting and allowing the film to feed off of the supply roll. A heating circuit contains a switch which is operated by a rotatable member and a severing wire which is positioned to extend transversely across the film when the film is laid across the horizontal wrapping surface in its dispensing position. The member, which operates this switch, is engaged by the film such that when the film is in its dispensing position the member is lifted away from the switch and the normally closed contacts thereof provide a path for electrical current to heat the wire, but when the film is severed the member rotates the put pressure on the switch thus opening the contacts thereof and removing the current from the wire. Thus power is delivered to heat the wire only when the film is in its dispensing position. The embodiment also includes a brake coupled to the film, and a guard positioned between the severing wire and the film. The guard is raised and lowered by a toggle. The toggle and brake are mechanically connected to the shaft of a spring-loaded solenoid. A manually operated switch is closed to apply an electrical potential to the solenoid which engages the brake to prevent the feed-off of the film and activates the toggle to raise the guard so that the film can be brought into contact with and severed by the heated wire. When the manually operated switch is released the spring of the solenoid returns the guard between the wire and the film and disengages the brake.

BRIEF DESCRIPTION OF THE DRAWINGS

FIG. 1 is a perspective view of the heat-severable film-dispensing apparatus of one embodiment of the invention;

FIG. 2 is a side view of the apparatus of FIG. 1 with the apparatus in its dispensing position;

FIG. 3 is another side view of the apparatus of FIG. 1 showing the apparatus in both its severing and predispensing positions;

FIG. 4 is a side view of the solenoid and toggle which raises and lowers the film guard; and FIG. 5 is a schematic diagram of a circuit for the apparatus of FIG. 1.

DESCRIPTION OF THE PREFERRED EMBODIMENT

Referring to FIGS. 1 and 2, it may be seen that the film-dispensing apparatus of the preferred embodiment of the invention is located beneath tabletop or horizontal wrapping surface 10 on which items are wrapped in film 12 which is made from a pliable, heat-severable material, such as polyethylene, supplied from replaceable roll 14. After a selected length of the film has been laid out, by an operator, across the surface of the table, he presses and holds bar 16 while pushing the film toward the back of the table and the apparatus severs the film which may then be used to provide an economical, protective wrapper for any one of a multitude of items.

The film-dispensing apparatus is comprised of vertical frame members 18 and 20, shown in FIG. 1, which have horizontal rollers 22 and 24 (shown in FIG. 2) extending therebetween. Rollers 22 and 24 are rotatably fastened to the frame members by bearings. Collars 34 and 36, located on roller 22, are movable axially along the roller for holding and positioning rolls 14 having different lengths.

Brake mechanism 40 shown in FIG. 2, is comprised of horizontal member 42 having a circular cross section and a longitudinal axis parallel to the longitudinal axes of rollers 22 and 24. The ends of member 42 are rotatably fastened to vertical frame members 18 and 20 by bearings. Horizontal axle 45 also has a circular cross section and its longitudinal axis is also parallel to horizontal member 42 and it is, likewise, rotatably fastened to vertical frame members 18 and 20 by bearings. Circular disc 50, which can be either joined to or integral with axle 45, has serrations or teeth 52 on the periphery thereof. Furthermore, rubber tires 54 and 56 (FIG. 1) are secured to axle 45 and turned therewith. The points on the circumferences of circular tires 54 and 56 nearest horizontal member 42 are in a spaced relation therewith so that when film 12 is threaded between the tires and the horizontal member there is a frictional coupling between tires 54 and 56, film 12 and member 42.

Moreover, brake 40 also includes bar 58 which has one end fastened to shaft 61 of solenoid or electromechanical device 60 and the other end 62 is located in spaced relation to the serrations 52 in disc 50. Solenoid 60 is fastened to frame member 20. When solenoid 60 is activated by an electrical potential, bar 58 is moved in the horizontal direction and end 62 thereof is moved into whatever space between teeth 52 is aligned therewith thus stopping and preventing the rotation of axle 45 and tires 54, 56. As a result, the frictional coupling between film 12, tires 54, 56 and horizontal member 42 prevents the film from being pulled or fed off of roll 14 and anchors the film in place between the tires and the horizontal member. Many other kinds of linkages between solenoid 60 and disc 50 would be apparent to one skilled in the art.

As shown in FIG. 1, a horizontal guide bar 63 is arranged between and connected to vertical frame members 18 and 20. Supported on the guide bar 63 is trapeze 64, comprised of parallel guide bars 66 and 68 which run parallel to guide bar 63, and connecting arms 70 and 72 which are rotatably coupled with and run perpendicular to guide bar 63, such that trapeze 64 can be pivoted around the guide bar.

Cooperating with trapeze 64 is switch assembly 73 which includes housing 74 attached to vertical frame member 18 into which spring-loaded plunger 75 can be compressed. Plunger 75 is in a spaced relation with trapeze 64 such that when the trapeze is in its down position, shown dotted in FIG. 3, connecting arm 70 thereof pushes plunger 75 into housing 74 thereby opening the normally closed electrical contacts of switch 73. Furthermore, magnet 76 is affixed to frame member 18 in spaced relation to switch 73 and trapeze 64 such that when trapeze 64 falls to its down position, it is held in place by magnet 76 rather than bouncing against the spring action of plunger 75 thereby opening and closing the contacts of switch 73. Magnet 76 accordingly protects switch 73 from the adverse effects of arcing and mechanical wear which would result if the trapeze was allowed to bounce thereon.

For severing the film, wire 86 is provided which is essentially perpendicular to and extends between frame members 18 and 20. Guard 78 for the wire is supported by rocker arm assembly 77 so that the guards extends along the wire 86 and perpendicular to the planes of vertical frame members 18 and 20. The assembly 77 includes connecting arms 80 and 81 which are parallel to the respective planes of frame members 18 and 20. One end of each connecting arm is pivotally fastened to guide rod 63 and the other end is joined to one end of guard 78. The downswing of the rocker arm assembly is limited by bumper 82 which is connected to frame member 18. Control device or toggle 84, which is fastened to frame member 20, moves rocker arm assembly 77 up and down by rotating it around guide bar 63 so that guard 78 is raised and lowered with respect to severing wire 86.

The operation and structure of the toggle 84 can be explained in reference to FIG. 4. Leg 87 is pivotally fastened at slotted end 88 thereof to frame member 20. The other end 89 of leg 87 is pivotally coupled to both horizontally movable shaft 61 and end 92 of leg 94. The other end 95 of leg 94 is pivotally fastened to rocker arm assembly 77. Spring 96 is wrapped around shaft 61, and collar 100 is fastened to spring 96, shaft 61 and shaft 58. When an electrical potential is applied to solenoid 60, shaft 61 is drawn in the direction of the arrow on FIG. 4 into the solenoid thereby compressing spring 96 while causing arms 87 and 94 to pivot into their flexed positions as drawn in dotted lines in FIG. 4, consequently rotating rocker arm 77 in a counterclockwise direction around guide arm 63 to lift guard 78 above wire 86 as shown in FIG. 3 and engaging brake 40.

Manually operated switch device 104 of FIG. 1 and 2 includes activating bar 16 and normally open microswitches 106 and 108 located at the ends thereof such that pressure on the bar closes the contacts of either or both of the switches. The switch assembly may be located on wrapping surface 10 as shown in FIG. 1 so that it can be hand operated, or it may be located on the floor near the base of the dispensing apparatus so that it can be foot operated.

Referring now to FIG. 5 it may be seen that the circuit includes terminals 110 and 112 which are connected to a supply of 110-volt AC voltage. On-off switch 114 is physically located on chassis 116 which is mounted on frame member 18 as shown in FIG. 1. Stepdown transformer 117 may be physically located inside of chassis 116, and when switch 114 is closed its primary winding is electrically connected across terminals 110 and 112. The secondary winding of transformer 117 is connected to one terminal of previously described member-operated switch 73. The other terminal is connected both through normally closed temperature-sensitive switch 122, which will be subsequently described, to severing wire 86 which is made from a resistive material that becomes heated when an alternating voltage is applied thereacross, and to the contacting portions of electrically parallel switches 106 and 108. The movable contacts of both of these switches are connected to solenoid or electromechanical device 60 so that when either of the switches is closed by pressure on bar 16, power is delivered to the solenoid to activate the brake and toggle or control device. Hollow circular member 124 extending between frame members 18 and 20 serves as a conduit for electrical wiring.

Normally closed temperature-sensitive switch 122, having an activating button, is located in housing 128 which is affixed to frame member 18. Wire 86 is fastened to lever 130 which has one end pivotally fastened to housing 128 and the other end connected by spring 138 to housing 128. As wire 86 is heated, spring 138 takes up the expansion thereof and gradually pulls lever 130 against the button to open the contacts of switch 122 at a predetermined temperature, and remove the power from wire 86 thus regulating the temperature thereof.

In operation, therefore, film 12 from roll 14 is threaded through brake 40, between the horizontal bars 66 and 68, underneath guard 78, over member 124 and across wrapping surface 10 as shown in FIGS. 1 and 2. Trapeze 64 is thereby pivoted around guide bar 63 to allow the contacts of switch 73 to close and supply power to electrical heating element or wire 86. After a selected length of film is pulled or fed off of roll 14, the operator of the dispensing apparatus depresses bar 16, as shown in FIG. 3, thereby closing switch 108 to supply electrical power to solenoid 60 thus causing brake 40 to grab hold of the film and the control device or toggle to raise guard 78. The operator can now push the film in the direction shown by the arrow in FIG. 3 toward the back of the table and, consequently, bring it in contact with heated wire 86 which severs the film along a transverse axis thereof. The severed film then reacts to the downward force exerted on it by the weight of trapeze 64 to slip to its dotted, severed position of FIG. 3. Trapeze 64 simultaneously rotates into its down or dotted position and depresses plunger 75 to open the contacts of switch 73 to remove the electrical power from severing wire 86. Magnet 76 keeps the trapeze from bouncing on plunger 75. Furthermore, the trapeze is designed so that when it is in its down position it holds the severed film out away from the apparatus so that the film can be easily grasped by the operator when the next wrapping cycle is to commence. Temperature-reactive switch 122 prevents severing wire 86 from becoming overheated.

The described apparatus for facilitating the dispensing of heat-severable film material, is designed to be located underneath the surface on which items are wrapped in the film thereby allowing maximum utilization of the wrapping space. Moreover, since the dispensing apparatus delivers the film in a laid-down position on the table, and severs the film in response to the activation of a manually operated switch, its operation is convenient and efficient. Furthermore, the apparatus is inexpensive to manufacture and requires a minimum of maintenance.

I claim:

1. Apparatus for dispensing and cutting heat-severable film from a replaceable supply roll, such apparatus including in combination, roller means supporting the supply roll and allowing the supply roll to rotate thus feeding off the film, brake means having a portion engaging the film, electrical heating wire positioned to transversely extend above the film for severing the film when engaged thereby, heating circuit connected to said wire and selectively delivering electrical power thereto thus heating said wire, said heating circuit having first switch means operable to connect and disconnect electrical power to and from said wire, first pivotal member for guiding the film and coupled to said first switch means for closing the same when the film is in a predetermined position to thereby supply electrical power to heat said wire, second pivotal member having a guard holding the film away from said wire, control means connected to said second pivotal member and operable to move said second pivotal member thereby displacing said guard to allow the film to come in contact with said wire thus severing the film, electromechanical means connected to said brake means and to said control means, and second manually operated switch means electrically coupled to said electromechanical means and being operative to supply an electrical potential thereto, said electromechanical means operating said brake means and said control device in response to said operation of said second manually operated switch means, said first pivotal member being rotatable to open said first switch means in response to the film being severed.

2. The apparatus of claim 1 wherein said first pivotal member is physically located above said first switch means, said first switch means being normally closed and responsive to the force of the weight of said first pivotal member thereon to open, said first pivotal member further having two guide bars through which the film is inserted and being held above said first switch means by the film in its said predetermined position such that the severing of the film allows said pivotal means to rotate down to open said first switch means thereby deenergizing said wire.

3. The apparatus of claim 2 further including magnet means located in a spaced relation to said first pivotal member and said first switch means such that said first pivotal member is restricted from bouncing up and down on said switch means as said first pivotal member rotates down as a result of the film being severed.

4. The apparatus of claim 1 wherein said film material is made from a polyethylene substance.

5. The apparatus of claim 1 wherein said brake means is comprised of first and second members of circular cross section having longitudinal axes parallel to each other and to the axis of the roll of film material, said first and second members being arranged in fixed spaced relation to each other so that as a result of the film being inserted therebetween there is frictional coupling between the film and said first and second members, said first member being rotatable and having a circular disc integral therewith with teeth on its periphery, shaft means arranged so that it can be slid into engagement with said teeth, said electromagnetic means being connected with said shaft means and responsive to the electrical potential supplied by the closure of said second switch means to engage said shaft means with said teeth thereby locking said first member to prevent the passage of film between said first and second members.

6. The apparatus of claim 1 wherein said second switch means is comprised of two pushbutton-operated microswitches electrically connected in parallel, bar means with each end thereof in abutting contact with the pushbutton of one of said microswitches, at least one of said microswitches being operable in response to a predetermined pressure anywhere along said bar to provide said electrical potential to said electromechanical means.

7. The apparatus of claim 1 wherein at least one of said roller means has collars located thereon for holding and locating the supply roll of film, and wherein said collars are axially movable along said roller means thereby being adaptable to hold and locate rolls having different lengths.

8. The apparatus of claim 1, further including third switch means which is normally closed, said third switch means being connected in said heating circuit and being operable to deenergize said wire when opened, and means on said wire engaging said third switch means to open the same upon a given expansion of said wire due to heating thereof thus selectively deenergizing said wire to regulate the temperature thereof.

9. The apparatus of claim 1 wherein said control means includes toggle linkage having at least first and second legs and a coil spring, said first leg being connected to said electromechanical means and to said second leg, said second leg being connected to said second pivotal member and said spring being coiled around said first leg so that when said electromechanical means is energized said second pivotal member is raised and said spring is compressed and when said solenoid is deenergized said spring causes said second pivotal member to be lowered.